United States Patent
Fling et al.

(10) Patent No.: US 7,336,898 B2
(45) Date of Patent: Feb. 26, 2008

(54) FIBRE OPTIC COMMUNICATIONS NETWORK

(75) Inventors: Richard William Fling, Bristol (GB); Barry Robert Fleury, Bristol (GB)

(73) Assignee: Radiodetection Limited, Bristol (GB)

( * ) Notice: Subject to any disclaimer, the term of this patent is extended or adjusted under 35 U.S.C. 154(b) by 745 days.

(21) Appl. No.: 10/754,574

(22) Filed: Jan. 12, 2004

(65) Prior Publication Data

US 2005/0152700 A1  Jul. 14, 2005

(51) Int. Cl.
*H04B 10/08* (2006.01)
*H04B 10/00* (2006.01)

(52) U.S. Cl. ............... 398/21; 398/33; 398/167; 398/169; 398/170

(58) Field of Classification Search ......... 398/20–22, 398/25, 33, 141, 151, 167–170, 183
See application file for complete search history.

(56) References Cited

U.S. PATENT DOCUMENTS

| | | | | | |
|---|---|---|---|---|---|
| 5,010,586 | A | * | 4/1991 | Mortimore et al. | 398/170 |
| 5,903,375 | A | * | 5/1999 | Horiuchi et al. | 398/37 |
| 6,710,863 | B2 | * | 3/2004 | Hotate et al. | 356/73.1 |
| 7,139,483 | B2 | * | 11/2006 | Murase et al. | 398/72 |
| 2004/0032642 | A1 | * | 2/2004 | Imai et al. | 359/334 |
| 2005/0152700 | A1 | * | 7/2005 | Fling et al. | 398/135 |

\* cited by examiner

*Primary Examiner*—Dalzid Singh
(74) *Attorney, Agent, or Firm*—Baker & Hostetler LLP

(57) ABSTRACT

A security system for controlling access to an enclosed conduit along which runs fiber optic cable, the conduit having a cover for access to the cable, the system having a communications receiver and a modulator responsive to an output of the receiver for coupling non-intrusively to the fiber optic cable adjacent the cover, the communications receiver being responsive to the presence or absence of an access authorization signal from an operator to cause the modulator to introduce a signal to the fiber optic cable indicative of the authorization status.

12 Claims, 6 Drawing Sheets

FIBRE OPTIC COMMUNICATIONS NETWORK

FIELD OF THE INVENTION

This invention relates to a fibre optic communications network, and also, in another aspect, to a security system and method for controlling access to an enclosed conduit along which runs fibre optic cable. The invention is capable of broad usage, but in one aspect it is particularly useful for monitoring attempted access to manhole covers for access to buried fibre optic cable used in telecommunications.

BACKGROUND OF THE INVENTION

There has been increasing concern over the security of access manholes for conduits containing the optic fibre cables used in telecommunications networks. Access for maintenance and repair is required at spaced locations along the conduit which is buried beneath the ground, but access to these conduits has to be restricted to authorised personnel. There is concern for example that terrorists may disable key routes in order to disrupt business and critical government communications, or that they may use manholes to place remotely controlled or timed explosive devices in open locations. By way of example, in urban environments, optical fibres often share the routes of copper telephone wires and the manholes are located every 150 metres or so in city duct structures: in the AT&T network in the USA, there are over 50,000 such manholes.

Security has conventionally been applied by the use of locking arrangements such as security bolts, requiring keys to open them, but this offers no security against a prepared intruder. Also, barriers tend to jam in icy conditions and are prone to dirt ingress.

The purpose of the invention is to provide an appropriate level of security governing manhole cover access, in a way which provides reliability and minimises installation cost. It is a further objective of the invention to allow such security to be provided with existing manhole cover installations.

SUMMARY OF THE INVENTION

The inventor has identified two separate issues surrounding the process of making access secure. Firstly, access through the manhole cover can be controlled, for example by locking the cover. Secondly, access or attempted access can be detected and any unauthorised access or attempted access can be notified to a central control. The central control can then alert the relevant authorities to take appropriate action. The invention offers a security solution which does not require controlled access, even though this may be an option in some situations.

Accordingly in one aspect, the invention provides a security system for controlling access to an enclosed conduit along which runs fibre optic cable, the conduit having a cover for access to the cable, the system having a communications receiver and a modulator responsive to an output of the receiver for coupling non-intrusively to the fibre optic cable adjacent the cover, the communications receiver being responsive to the presence or absence of an access authorisation signal from an operator to cause the modulator to introduce a signal to the fibre optic cable indicative of the authorisation status.

Preferably, the security system comprises means for detecting opening of the cover and providing a corresponding signal to the communications receiver, the communications receiver being responsive additionally to the signal from the detecting means to cause the modulator to introduce a signal to the fibre-optic cable indicative of attempted cover opening with or without access authorisation.

The invention thus uses the fibre optic cable as a way of communicating a security signal, for example to a central control station. In preferred embodiments of the invention, optical time domain reflectometry (OTDR), and preferably coherent optical time domain reflectometry (C-OTDR), are used from receivers, which have access to one or both ends of the fibre optic cable, to identify the signals which have been provided non-intrusively onto the fibre optic cable locally at one or a plurality of access locations. C-OTDR in particular allows the central station, by communicating with the receivers, to identify the specific location of each such signal, so as to enable identification of the specific manhole cover. This allows appropriate preventive action or enforcement action to be taken. It will be apparent that the information provided to the control station may include the fact that access has been attempted physically, or that an operator has attempted to communicate electronically with the communications receiver to gain authorisation.

The invention does not require any system for preventing physical access, and does not in any other way adversely affect normal maintenance operations on the manhole which require occasional removal of the manhole cover and access to the chamber below. Any failure of the security system will not prevent continuation of normal inspection and maintenance operations.

Thus the system of the invention provides a secure means of detecting and validating access to manholes and providing a secure communication means of reporting valid and invalid access events. Since the means of modulating the fibre optic cable locally is non-intrusive, the security system is electrically isolated from other locations along the fibre optic cable. This suggests broader applications of the concept of the invention, involving telemetry from multiple locations to a central control station. This would provide particular benefit where conventional communication media such as radio, electrical cable or optical transmission might be inapplicable or costly.

U.S. Pat. No. 5,355,208 (Crawford et al.) discloses coded ultrasonic hand-held transmitters used to disturb the optical signal on a loop, but, whilst the individual code can be identified, the system cannot be used for telemetry along the loop simultaneously from multiple points. The system disclosed simply locates a disturbance along the loop and determines, from any transmitted code, whether that disturbance is from an authorized person.

U.S. Pat. No. 5,379,357 (Sentsui et al.) discloses ultrasonic modulation of one out of several optic fibre cables, in a work section of cables, to identify that particular cable. Only one modulator is used, on each fibre optic cable, and no telemetry from multiple, individually identifiable sources, is possible.

Accordingly, a second aspect of the invention provides a fibre optic communications network comprising a fibre optic loop; an optical time domain reflectometry transceiver connected to one or both ends of the loop, for detecting disturbances to the loop; and a multiplicity of modulators spaced along the loop and coupled non-intrusively to the fibre optic loop, for transmitting signals into the loop by non-optical local modulation of the fibre optic material; the transceiver being arranged to identify and decode those signals individually using optical time domain reflectometry, whereby telemetry may be performed from the modulators to the transceiver.

Applications of this simplex telemetry system include the manhole cover access security system of the first aspect of the invention. They also include other multi-drop sensor process measurement applications such as: very high voltage electrical installations where galvanic isolation, equipment and operator safety add to the system complexity; telemetry of research experimental apparatus, for example in high energy physics and in chemistry; remote locations in hazardous environments, where an optical barrier is provided between dangerous chemical or biological environments using the fibre optic cable, and with multiple low cost sensor apparatus; and communication from remote locations for example in food processing industries, where zero contamination of materials is essential.

It will be apparent that fibre optic cable which is used for the telemetry may additionally be used for other communications of data or voice, on different channels, but this is not essential.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

In order that the invention may be better understood, preferred embodiments will now be described, by way of example only, with reference to the accompanying drawings.

DESCRIPTION OF PREFERRED EMBODIMENTS

A simplex telemetry system embodying the invention will now be described with reference to FIG. 1.

A first receiver R1 using coherent optical time domain reflectometry (C-OTDR) is connected to one end of a fibre optic cable F, on which there are n spaced locations where signalling is required: in this example, the stations M1, M2, M3 . . . Mn are portions of the optical fibre cable within manhole chambers which allow access to the cable at these points.

In other forms of OTDR, it may be necessary to connect both ends of the cable F. C-OTDR and its application to intruder detection is disclosed for example in U.S. Pat. No. 5,194,847. Further, a distributed fibre optic sensing system for detecting mechanical, acoustic or ultrasonic disturbances is disclosed in U.S. Pat. No. 5,355,208, which uses Sagnac interferometry in fibre optic loops. Co-pending UK patent application number 0311333.9 of $16^{th}$ May 2003 entitled "Optic Communication or Transmission Media Sensing" discloses the use of C-OTDR, which detects the distance along the fibre optic cable at which a disturbance has occurred, using the time elapsed between each of several pulses entering the fibre optic cable, and detecting the back scattered radiation caused by the pulse and indicative of the disturbance. The intentional application of a stress to a buried optical fibre, in order to identify the location along the fibre optic cable of that stress point, is disclosed for example in U.S. Pat. No. 6,148,123 (Hossein Eslambolchi et al.).

The US patents referred to above are hereby incorporated by reference into the specification.

Figure 1:
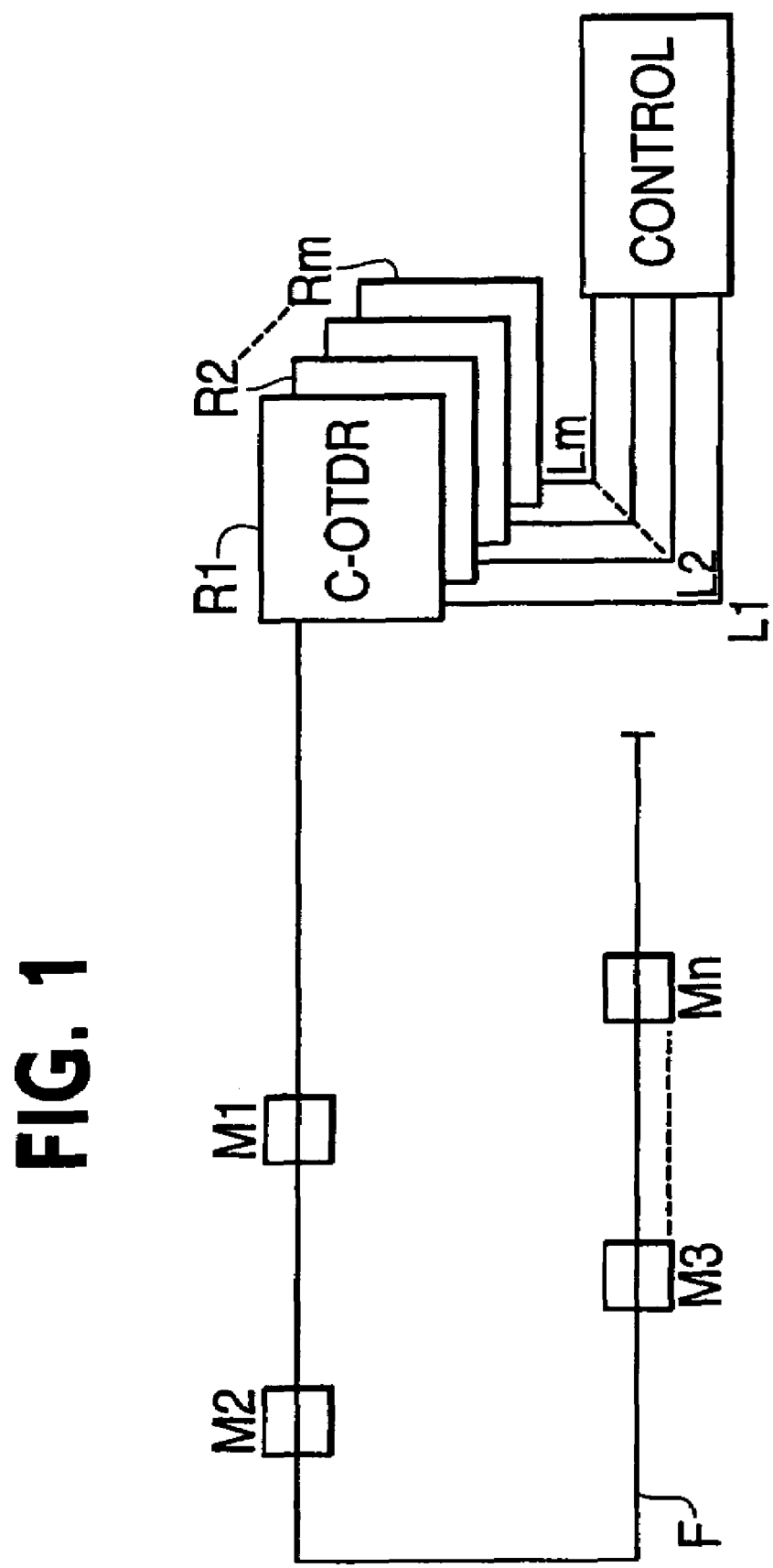
FIG. 1 is a schematic diagram of a communications network including multiple fibre optic loops and a control station in accordance with an embodiment of the invention.

With further reference to FIG. 1, the entire network comprises m such fibre optic loops F and m such receivers R1, R2 . . . Rm whose outputs are provided along communications links L1, L2 . . . Lm to a central control station.

Figure 3:
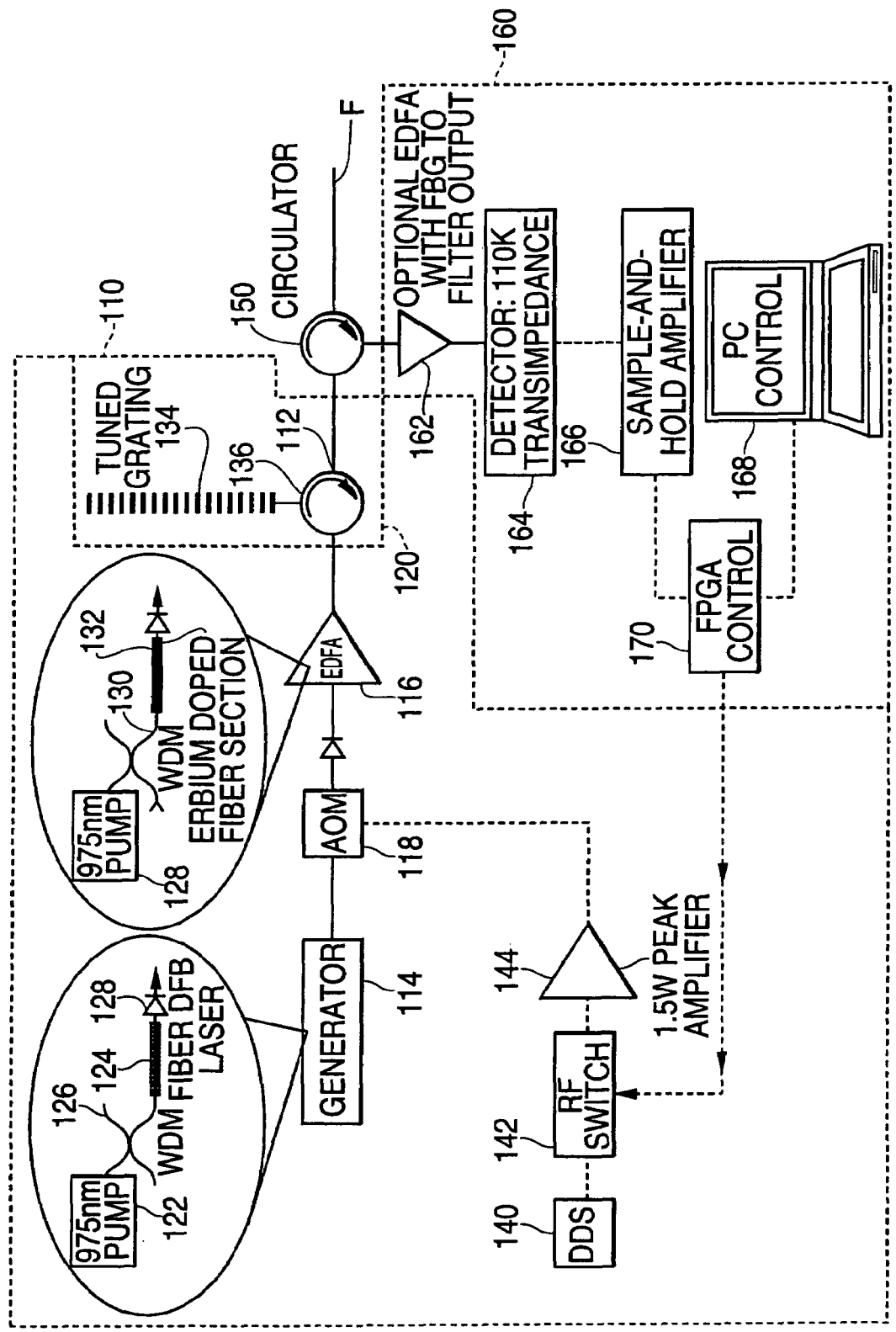
FIG. 3 is a diagram of a C-OTDR receiver/regenerator capable of use in the network of FIG. 1.

FIG. 3 shows one such receiver R, which may also be described as a transceiver, and which comprises a source 110, a circulator 150 and a detection stage 160.

The source 110 has an output 112, which provides pulses of coherent radiation, and the source output 112 is optically coupled to the circulator 150. The circulator 150 is also optically coupled to the detection stage 160, and to the fibre optic cable F. The circulator 150 directs radiation from the source 110 into the fibre-optic cable F and receives radiation returned from the fibre-optic cable F and directs the received radiation into the detection stage 160.

The circulator 150 has an input stage and a receiving stage, which input the pulses into the fibre-optic cable F and receives the backscattered radiation caused by the pulses from the cable F respectively. In this example, the input stage and receiving stage is the same unit. However, alternatively, separate units could be provided to perform the same function.

The detection stage 160 detects the intensity of the backscattered radiation input from the circulator 150 as a function of time.

In addition to the output 112, the source 110 comprises a light generator 114 supplying an erbium doped fibre amplifier (EDFA) 116 via an acousto-optic modulator (AOM) 118. The EDFA 116 is connected to a bandpass filter 120 which comprises an output 112.

The light generator 114 comprises a pump 122 supplying a fibre distributed feedback laser 124 via a Wavelength Division Multiplexer (WDM) 126 coupled between the two and an isolator 128. The pump 122 generates radiation at a wavelength of 975 nm. Other frequencies of radiation could also be generated by using a different pump and WDM and laser. The radiation generated by the pump 122 is fed into the WDM 126 and from there into the laser 124. The laser 124 then outputs a beam of radiation at a wavelength of 1550.116 nm. The isolator 128 prevents radiation returning into the laser 124. Wavelengths other than this could also be used in the invention.

The radiation output from the generator 114 is controlled by AOM 118 which pulses the beam from the generator 114. The AOM 118 is controlled by a Radio Frequency (RF) switch 142, which modulates a signal generated by a DDS (direct digital synthesiser) 140, and the modulated signal produced by the RF switch 142 acting on the generated signal is amplified by an amplifier 144 to a power of 1.5 W peak before being input into the AOM 118. AOM 118 is driven at 110 MHz with the RF switch turning the 110 MHz signal on and off, but other frequencies could alternatively be used, as appropriate. Other sources producing pulsed laser radiation could also be used in the invention.

The RF switch 142 is controlled by a control stage 170. The control stage 170 controls the opening ratio and timing of the AOM 118 via the RF switch 142. The control stage 170 is also connected to the detection stage 160 so as to synchronise the source 110 and detection stage 160.

The EDFA 116 comprises a second pump 128 at the same wavelength as the first pump 122. Other wavelengths could also be used. An erbium doped fibre section 132 is connected to the second pump 128, via a second WDM 130, and amplifies the pulses from the AOM 118. In this example, output from the EDFA 116 is then passed through the narrow bandpass filter 120. The bandwidth of the filter 120 is, in this example, 0.3 nm. The filter 120 comprises a fibre Bragg grating (FBG) 134 and a circulator 136. The FBG 134 removes amplified spontaneous emission (ASE) from the EDFA 116 and only allows light within the bandwidth to re-enter the circulator 136 and be output from the output 112 of the source 110.

The EDFA 116 gives a gain of 30 dB with pulses 200 ns in duration. An AOM 118 with a 90% transition time of ~25 ns and a separation between pulses of at least 50 µs is provided.

The pulses produced by the source 110 are at a power such that non-linear effects are small. The source produces pulses of ~1 W for ~200 ns, which gives an average energy of the pulses of 0.2 µJ, keeping non-linear effects low and within tolerances.

The pulses output from the source 110 at output 112 are input into an input and receiving stage, which in this example is the circulator 150. The circulator 150 inputs pulses received from the source 110 into the fibre optic cable F, to which the circulator 150 is coupled.

A proportion of the radiation backscattered within the fibre-optic cable F is received back at the circulator 150. This backscattered radiation is output from the circulator 150 to the detection stage 160.

The detection stage 160 comprises a further EDFA 162 to amplify the signal from the circulator 150. The further EDFA 162 is the same as EDFA 116 in the source 110, except that a fibre Bragg grating (not shown), which is the same as grating 120, is included within the further EDFA 162.

Alternatively, the further EFDA 162 may be omitted, if the intensity of the backscattered radiation from the fibre-optic cable F is sufficient for detection to be achieved without the further EDFA, at a suitable signal to noise ratio.

A detector 164 is connected to the output of the further EDFA 162 and the signal output from the detector 164 is output to a sample-and-hold amplifier 166, which is controlled by the control stage 170, which in this example comprises a FPGA controller, to sample the signal from the detector 164 at a particular time.

The sample-and-hold amplifier 166 is thus synchronised with the AOM 118 of the source 110, so that the time after the pulse enters the fibre-optic cable F is known, and the time delay from entry into the fibre-optic cable F to backscatter to the detection stage 160 is also known. The distance along the fibre F that the pulse has travelled before being backscattered can be determined from the time delay. The sample-and-hold amplifier is timed to capture the signal from a specific region M of the fibre. More than one sample-and-hold amplifier may be used, and these may be used to capture signals from more than one region M1 to Mn of the fibre.

The signal sampled by the sample-and-hold amplifier 166 is input into the control stage of the FPGA controller 170, which is, in turn, controlled by a PC control 168. The sampled signal is received by the PC control 168 and processed as will be described below.

Figure 4:
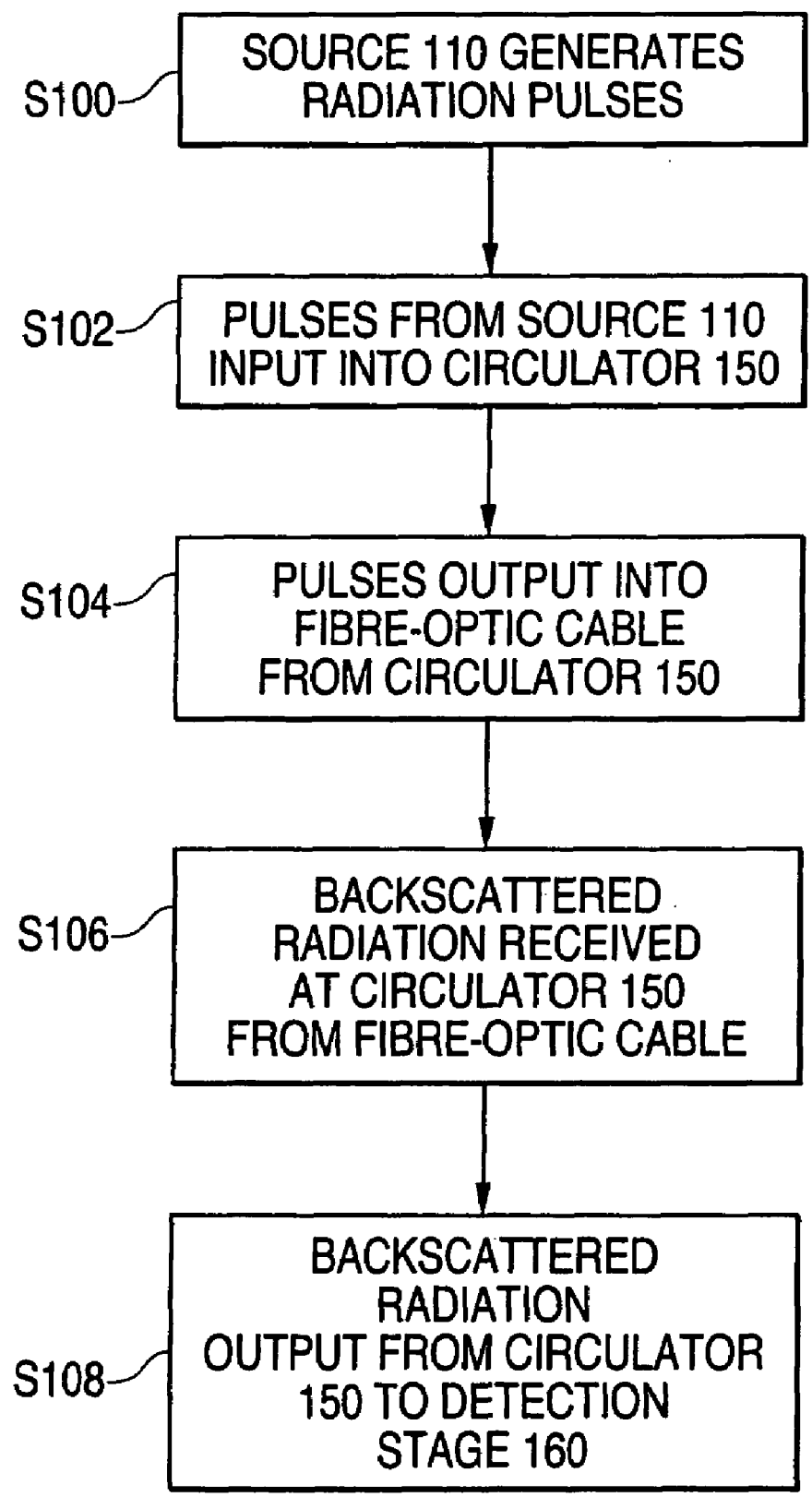
FIG. 4 is a flow diagram showing a method of operation of the C-OTDR regenerator of FIG. 3.

With reference to FIG. 4, the source 110 generates pulses at S100. Each pulse enters the circulator 150 at S102 and is output into the fibre-optic cable F at S104.

Each pulse travels along the fibre-optic cable F, with some backscattering along its length. The backscattered radiation travels back along the fibre-optic cable F, and re-enters the circulator 150 at S106. The circulator 150 outputs the backscattered radiation received to the detection stage 160, and the detection stage 160 detects the backscattered radiation, at S108.

Figure 5:
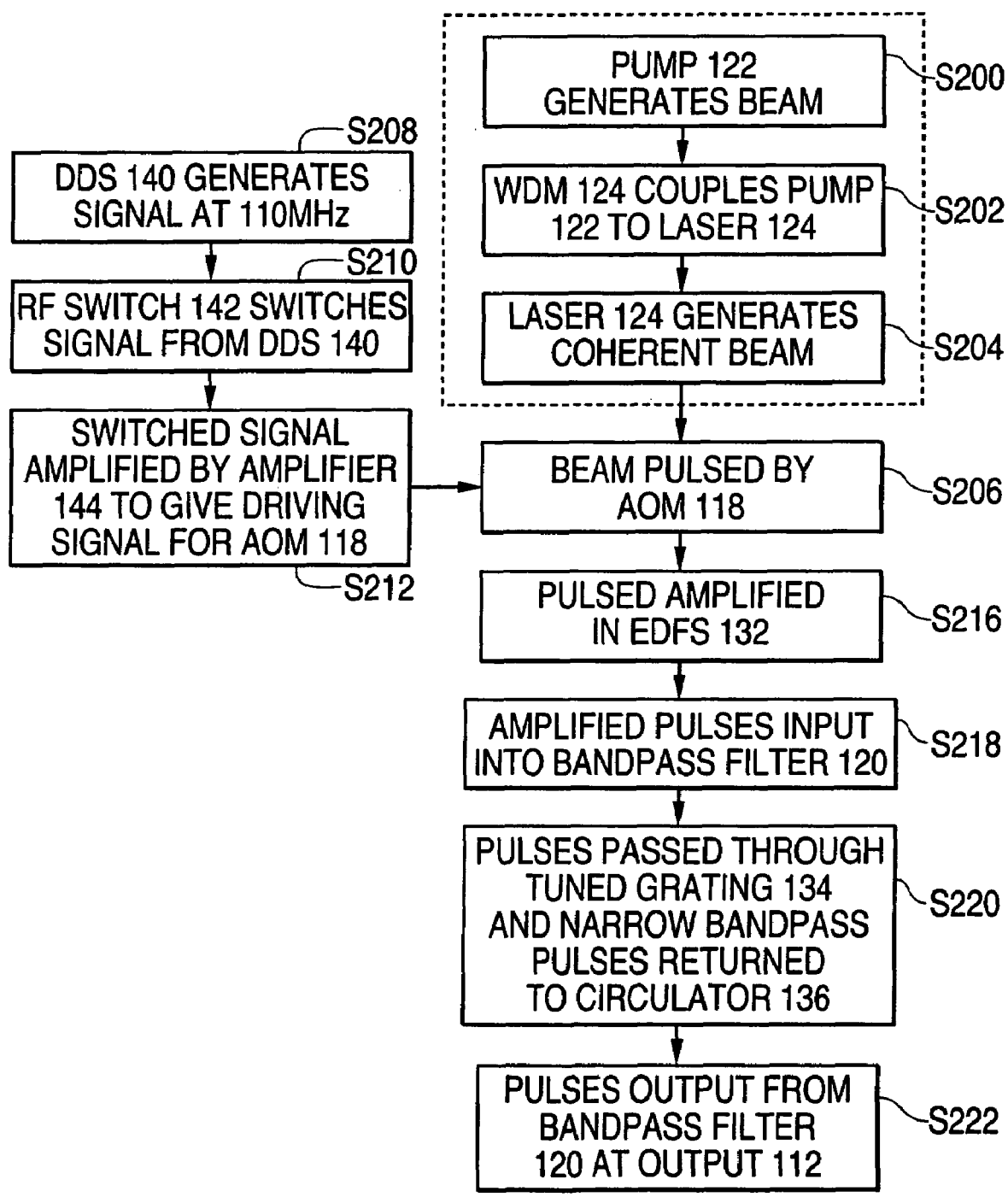
FIG. 5 is a flow diagram showing the operation of a source of the regenerator of FIG. 3.

FIG. 5 is a flow diagram showing a method of operation of the source 110. Within the generator 114, the pump 122 creates light with a wavelength of approximately 975 nm at S200. The WDM 126 creates an output for pumping the DFB laser 124 at S202, and the fibre DFB laser 124 creates a coherent beam of radiation with a line width of approximately 30 kHz, giving a coherence length of over 6 km in fibre, which is output from the generator 114 at S204.

The beam from the generator 114 is then pulsed by AOM 118 at S206. AOM 118 is controlled by the control stage 170. The DDS 140 produces a RF signal at 110 MHz at S208. The RF switch 142, controlled by the control stage 170, switches the RF signal of the generated signal at S210. This signal is amplified by the 1.5 W peak amplifier 144 at S212.

The beam is therefore pulsed by the AOM 118 according to the RF switch 142 signal, which is controlled by the control stage 170. The AOM 118 provides pulses of a length of approximately 200 ns, with a separation between pulses of more than 50 µs.

The further EDFA 130 then amplifies the signal at S216. The amplified pulse, with a power of approximately 1 W, is then passed through the circulator 136 of the bandwidth filter 120 at S218. The pulse is filtered by the fibre Bragg grating 134 at S220, in order to remove amplified spontaneous emission noise from the EDFA 116.

The bandwidth of the filter is 0.3 nm and each pulse output from the source 110 has a duration of approximately 200 ns, which corresponds to a spatial extent of the pulse of 40 m within the fibre-optic cable F. The power of the amplified source 110 is approximately 1 W, giving an energy of each pulse of 0.2 µJ. The wavelength of the input pulse is 1550.116 nm with a line width of 30 kHz.

Figure 6:
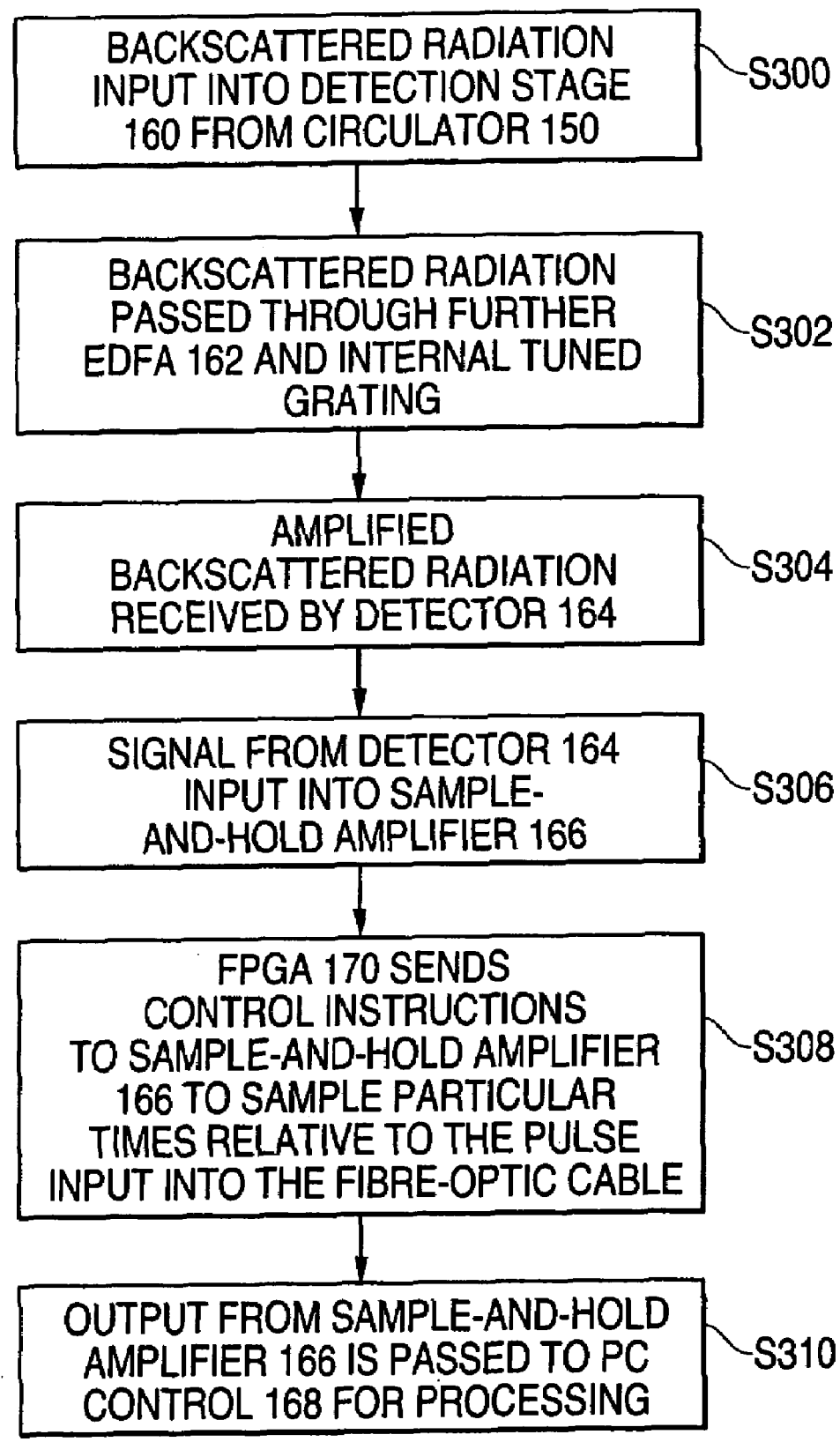
FIG. 6 is a flow diagram showing the operation of a detection stage of the regenerator of FIG. 3.

FIG. 6 shows a method of operation of the detection stage. The backscattered radiation from the circulator 150 is input into the detection stage at S300. The radiation is passed through the further EDFA 162 at S302 to amplify the signal and filtered to remove any radiation at a wavelength of other than 1550.116 nm.

The amplified radiation is then input into the detector 164 at S304. In this example, the detector 164 is a fibre-coupled photodiode detector with a transimpedance of 110 kΩ. However, other detectors may also be used.

The detected signal is output from the detector 164 to the sample-and-hold amplifier 166 at S306. The sample-and-hold amplifier comprises a sample-and-hold device, giving a small-signal bandwidth of 15 MHz. An $8^{th}$ order, progressive-elliptic, low-pass filter (Linear Technologies LTC1069-1) then removes signal components above 3 kHz, effectively smoothing the transitions between samples. The output is buffered by an op-amp stage giving 20 dB gain over 3 kHz bandwidth. The sample-and-hold device generates 150 μV RMS noise, the low-pass filter 110 μV RMS, and the operational amplifier 15 nV/√Hz at the input. Alternatively, a linear filter can be used.

The sample-and-hold amplifier 166 receives control instructions from the FPGA 170 at S308 to sample particular times relative to the pulse input into the fibre-optic cable F.

The output from the sample-and-hold amplifier is then passed to the PC (control) 168 at S310 for processing.

The telemetry system of FIG. 1 is used as follows: a signal, which may represent any form of information such as voice or data, is applied non-intrusively to the fibre optic cable F at one or more of the stations M. This is achieved by a modulator, described in greater detail below with reference to FIG. 2, which stresses the fibre in some way. The modulator may influence the fibre by applying a mechanical vibration, or by applying an electromagnetic field across it, or by applying mechanical pressure or even a temperature difference. It may bend the fibre periodically. Any of these disturbances causes a variation in the backscattering locally of the optical fibre, which provides the receiver R with appropriate positional information, as well as delivering the modulated signal. The modulation is non-intrusive in the sense that there is no optical coupling: the optical signals conveyed by the fibre optic cable are not interfered with. The signals and positional information identified by the receivers R are conveyed to the central control station, for analysis and recordal. Appropriate outputs, including the received signals, are provided to an operator at the control station.

In one example, the stations M are very high voltage electrical sub-stations, and the fibre optic cable F is the only physical connection between them, so as to provide galvanic isolation. Data from each station may include electrical status information, which is then encoded and used as a modulated signal to be sent along the fibre.

Alternatively each station M may be a different experimental location for research into high energy physics or chemistry, and corresponding experimental data may be modulated as a signal onto the fibre optic cable F and transmitted to the central control station.

The fact that the only communications between the stations M is the optical fibre is also very useful where the stations are in hazardous environments, for example involving dangerous chemicals or biological materials, and sensor apparatus may provide modulated data onto the fibre optic cable, to communicate the sensed information to the control station. Contamination between different locations in food processing plants can also be eliminated by communicating solely through the fibre optic cable F, between stations M, to provide sensor data or voice communications or other information to the central control station.

Figure 2:
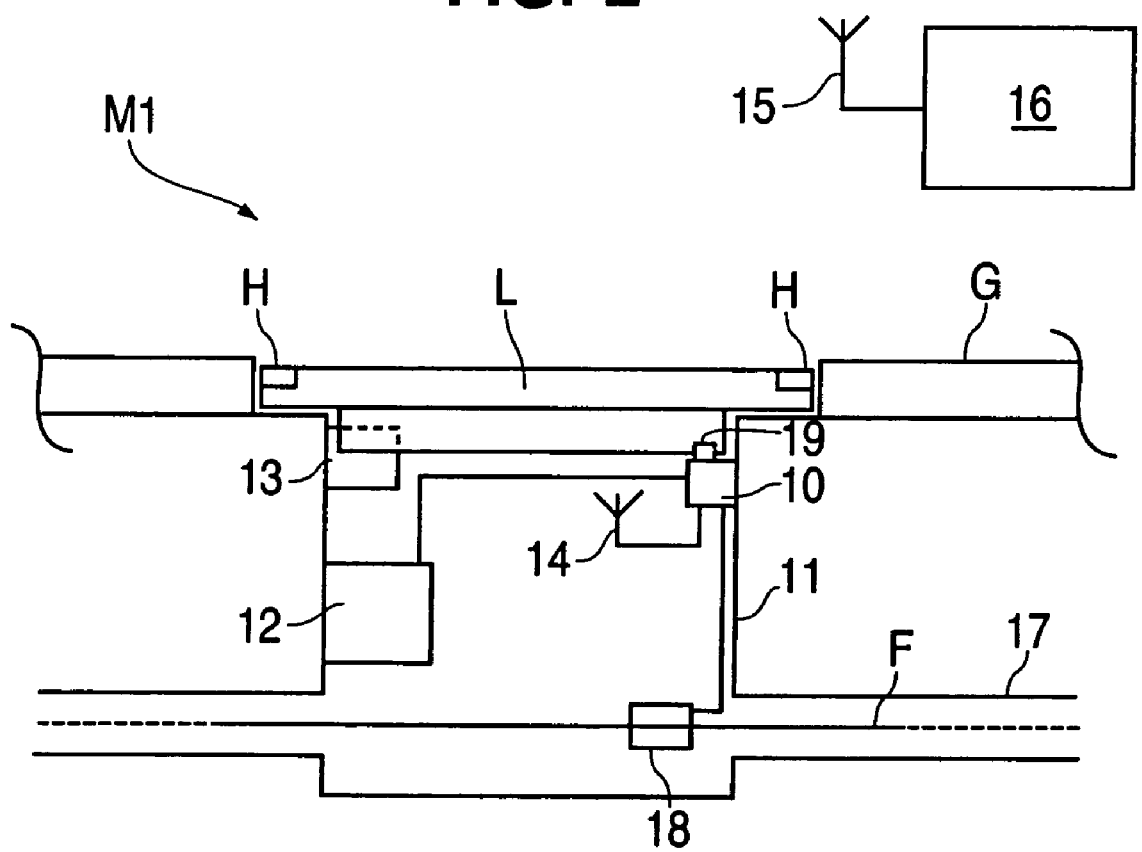
FIG. 2 is a schematic side view of a manhole for inspecting a fibre optic cable conduit, including a security system embodying the invention.

An application of this telemetry system to manhole security will now be described with reference to FIGS. 1 and 2. A communications network comprises multiple fibre optic loops F each with its own C-OTDR receiver R (in effect a transceiver) which communicates with a central office. One such station M1 is shown in FIG. 2. The fibre optic cable F is buried in a tubular conduit 17 below ground G and the conduit 17 opens into a manhole chamber 11 with a cover L. The cover L may be lifted using appropriate levers engaging with openings or holes H. The manhole cover or lid L may additionally have a lock 13, for example including a screw threaded bolt engaging with a screw threaded recess, and actuated by an electrical motor driven by a battery. Such a motor may be actuated under the control of a microprocessor which responds to an appropriate authorisation code transmitted from above ground by an operator.

A communications receiver 10 is installed adjacent the cover L within the chamber 11. The receiver 10 has its own replaceable internal battery, in this example, although optionally the receiver 10 could be combined with the lock arrangement 13, where this is provided. The receiver 10 has an antenna 14 for receiving radio communications from a handheld transmitter 16 with its own antenna 15. The transmitter 16 is preferably incorporated into a self-contained handheld remote control unit, for use by authorised personnel, or else incorporated into a detector such as that disclosed in U.S. Pat. No. 6,107,081 (incorporated herein by reference) for detecting buried cables using measurements of horizontal and vertical magnetic field strength. The receiver 10 is connected to a modulator unit 18 and to a threat countermeasure unit 12. The modulator unit 18 applies a mechanical stress to the fibre optic cable F in accordance with the signal received from the receiver 10. This may consist of a small number of bits of information, in the form of pulses, or a more complex modulation. In this way, the signal is passed into the fibre optic cable, for identification and preferably also location, at the C-OTDR receiver.

Low frequency electromagnetic communication, for example at 65 kHz, is preferably used between the antennas 14 and 15. Vertical antenna orientation of both transmitter and receiver should provide communication when the transmitter is placed at the edge of the manhole cover 11, or further away from it. The cover will act to focus the flux vertically, so a vertical receiving antenna 14 is desirable. The frequency of transmission may be selected to optimise coupling whilst minimising field distortion and field loss. The transmissions are preferably encoded to provide security, and electromagnetic interference alarm detection is advantageously provided. Thus if the receiver 10 detects electromagnetic interference, which may be as a result of unauthorised attempted access, it will signal an alarm condition.

The transmitter 16 is arranged to transmit an individual authorisation code to the receiver 10, and the receiver 10 is programmed to authenticate such codes and to provide an access authorisation signal. If the receiver 10 detects that an unauthorised transmission has been made, suggesting unauthorised attempted access, then it will provide an appropriate alarm signal to the modulator 18.

Preferably the receiver 10 memory stores data identifying its particular location, i.e. it stores a code unique to that manhole. The access authorisation routine carried out by the receiver 10 and the transmitter 15 preferably involves a two-way data transmission, although this is not essential, and one-way transmission from the transmitter 16 is feasible. In the event of two-way transmission, the receiver 10 receives an initial request transmission from the transmitter 16. It then transmits a pseudo random code back to the transmitter 16, the code representing the specific location of the manhole. The transmitter 16 then accesses an appropriate authorisation code from its memory, which it transmits in a second pseudo random code transmission to the receiver 10. The receiver 10 then compares this transmission with the appropriate authorisation code, and determines whether access should be authorised. It may then transmit a verification signal back to the handheld transmitter 16. It records the transaction in its memory, and provides an appropriate access authorisation status signal to the modulator 18. Where a lock 13 is provided, it is preferred that the receiver 10 is arranged to authorise unlocking.

The communications receiver 10 also preferably includes a detector 19, for example a micro-switch, for detecting removal or partial removal of the manhole cover 11. The sensor 19 is chosen for simplicity and reliability. Such sensors could be standard security detectors, or application specific, environment specific sensors such as magnetic cover detectors, proximity switches, mechanical limit switches, thermal sensors and Doppler motion sensors.

In this example, the modulator 18 is an acoustic modulator, which surrounds the fibre optic cable F.

The threat counter measure unit 12 is a preferred option, for providing an immediate counter measure in the event that the receiver 10 detects unauthorised attempted access. Preferably, this is initiated by the receiver 10 detecting movement of the manhole cover 11, in a situation when no authorised signal has been detected. The threat counter measure unit 12 may for example include an explosive canister with paint or dye, directed upwards; it may include a smoke canister; it may provide an acoustic alarm; and it may incorporate an explosive device for stunning the assumed intruder.

The receiver 10 preferably incorporates a data memory for recording every event, including attempted accesses. This may be accessed and downloaded during periodic maintenance, by authorised personnel. This would coincide with maintenance or replacement of the battery.

The control station monitors all the chambers and determines the status, determining any alarm events reliably through a software error control protocol. This system is designed for use without the need for preventing access to the manhole, and the control station determines what remedial action, if any, is required when unauthorised access has been detected. For example, the local enforcement authorities may be alerted.

System integrity is preferably enhanced by adding sensor self-test and fault diagnostics functionality, with the data from such testing and diagnosis being communicated back to the central office using the telemetry system along the fibre optic cable F.

Many optical fibre communications networks comprise cables linked to a series of optical signal regenerators at regeneration stations, each of which has a power source, environmental housing and often a dedicated telephone line to a central office. Conveniently, the C-OTDR units R1 to Rm may be housed in the regeneration stations, and may be integrated into the regenerators.

It is further envisaged that, where it is permissible to use a metallic sheath over the fibre optic cable, the sheath may be used to enhance system functionality; such that the OTDR unit can poll the chamber receivers 10 and can exchange and verify data and commands in a secure manner. The metallic sheath provides a return communications path from the C-OTDR unit R to all the receivers 10 connected to the optical fibre, and this enables the use of similar code validation procedures to those used between each receiver and the handheld transmitter unit 16. In addition, the return communications path facilitates the automated system maintenance and diagnostic testing of the receiving unit 10, by requesting self-test or diagnostics procedures, and by initiating periodic communications link integrity test.

The system described may be integrated with a line management system (LMS) and a system for enabling electromagnetic location of the buried optical fibre cable. Typically, a portable transceiver unit such as the transmitter locator 16 of the aforesaid U.S. Pat. No. 6,107,081 contains a signal transmitter capable of applying a Locate signal current to the fibre protective metallic sheath. In use, the LMS can be accessed from a front panel user interface LCD display at a regeneration station or via a telephone line using a terminal VT100 interface (via a MODEM) or DTMF tones (from a phone handset). Remotely controlled system functions apply the Locate tone to the fibre sheath. This system enables field technicians to remotely apply a Locate signal to the fibre and then, with the use of a compatible electromagnetic locator 16, locate buried fibre lines in horizontal (plan) position and depth.

The C-OTDR unit R may be deployed at the same place as the LMS (in the same regeneration station), optically connected to fibres within the cable. Within the role of the security application described, the output of the C-OTDR detector and data demodulator can be linked to the LMS unit such that, with appropriate functionality in the software, a system is formed which enables the system level integration of all these features described to be implemented.

Any discussion of prior art throughout the specification is not an admission that such prior art is widely known or forms part of the common general knowledge in the field.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

The invention claimed is:

1. A fibre optic communications network comprising:
   a fibre optic loop;
   an optical time domain reflectometry transceiver connected to one or both ends of the loop, for detecting disturbances to the loop; and
   a multiplicity of modulators spaced along the loop and coupled non-intrusively to the fibre optic loop, for transmitting signals into the loop by non-optical local modulation of the fibre optic material;
   the transceiver being arranged to identify and decode those signals individually using optical time domain reflectometry, whereby telemetry may be performed from the modulators to the transceiver.

2. A network according to claim 1, in which the transceiver is a coherent optical time domain reflectometry transceiver, arranged to locate and decode the signals using coherent optical time domain reflectometry.

3. A network according to claim 1, in which the transceiver is arranged to locate the modulators along the loop, whereby to identify the sources of the corresponding signals.

4. A network according to claim 1, in which the modulators are electromechanical and vibrate the loop locally.

5. A network according to claim 1, in which the modulators are electromagnetic and generate an electromagnetic field across the loop.

6. A network according to claim 1, in which the modulators include signal generators for generating the signals in response to an external input.

7. A network according to claim 6, in which the external input comprises data from a local detector.

8. A network according to claim 6, in which the signals comprise data representative of the identity of the modulator.

9. A method of telemetry on a fibre optic loop, using an optical time domain reflectometry transceiver connected to one or both ends of the loop, comprising applying a local modulation, at any one of a plurality of spaced locations along the loop, to transmit a signal non-intrusively into the loop by non-optical local modulation of the fibre optic material, and using the transceiver to identify and decode those signals using optical time domain reflectometry, whereby signals are sent from selected locations along the loop to the transceiver.

10. A method according to claim 9, in which the signals are identified and decoded using coherent optical time domain reflectometry.

11. A method according to claim 9, including locating the origin of each said signal along the loop.

12. A fibre optic communications network comprising:
a fibre optic loop;
optical time domain reflectometry receiving and transmitting means connected to one or both ends of the loop, for detecting disturbances to the loop; and
modulating means spaced at multiple locations along the loop and coupled non-intrusively to the fibre optic loop, for transmitting signals into the loop by non-optical local modulation of the fibre optic material;
the receiving and transmitting means being arranged to identify and decode those signals individually using optical time domain reflectometry, whereby telemetry may be performed from the modulating means to the receiving and transmitting means.

* * * * *